UNITED STATES PATENT OFFICE 2,464,834

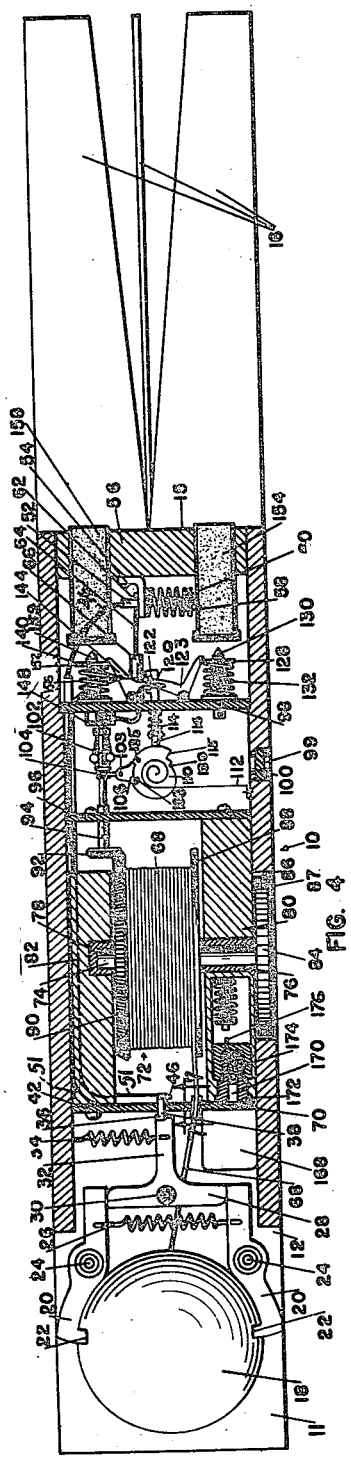

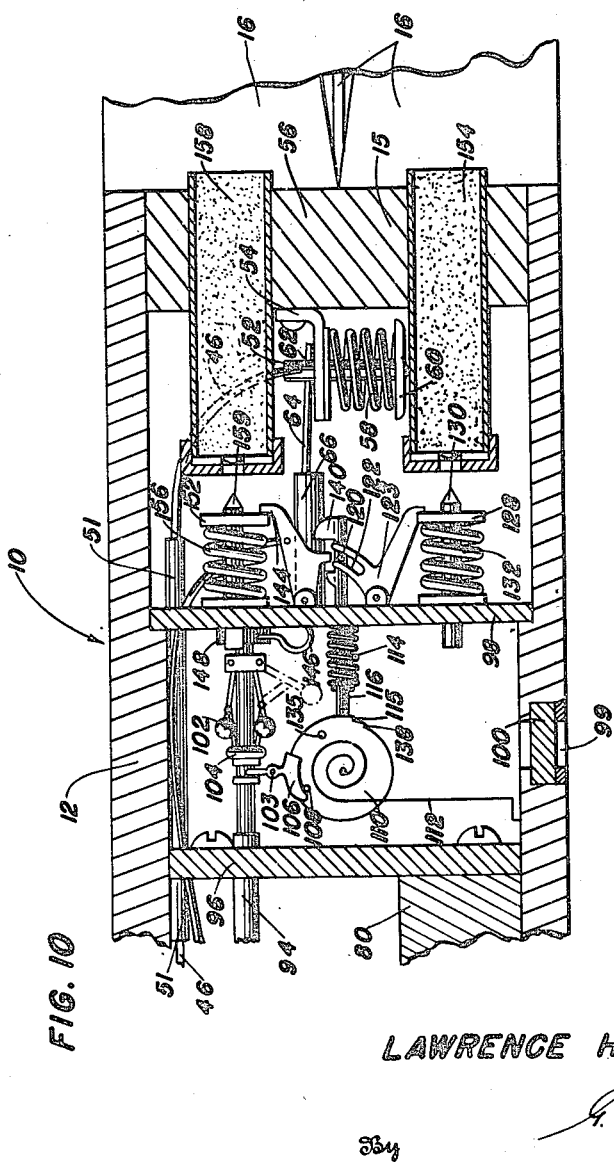

METHOD AND APPARATUS FOR DETERMINING DEPTH AND CURRENT DIRECTION

Lawrence H. Taylor, United States Navy

Application March 16, 1945, Serial No. 583,141

16 Claims. (Cl. 73—290)

(Granted under the act of March 3, 1883, as amended April 30, 1928; 370 O. G. 757)

This invention relates to devices with which soundings may accurately be determined of the depth of water at any given point, and to a method of using the same.

Heretofore, devices for determining the depth of water, such as lead lines and fathometers have been limited in their use to determine the depth of water immediately beneath the ship, and hence, are only useful in an area which can be traversed by the ship. It would be very helpful if the navigator could determine the depth of the water far enough in advance of the ship to enable it to maneuver clear of an obstruction or shallow area, or if the ship or an aircraft is fog bound, to determine the trend of the bottom so that by comparison with charts, the approximate position of the ship or aircraft may be determined. Frequently, it is desirable to be able to determine the depth of the waters along shores and rivers without sending a ship into the area, for example, to obtain data as to the contour of the bottom near a shore, the differential in water depth between low and high tides, the presence of sand bars, high and low water in rivers, and/or direction and velocity of current and tidal flow. Such data would be useful in navigating unsurveyed waters, determining areas suitable for landing operations, mine laying operations, and the like.

With the foregoing in view, it is an object of this invention to provide a device which will be suitable to be projected from a ship or dropped from an aircraft into the area to be surveyed, and whether projected from a ship or dropped from an aircraft, will give a visible indication of the exact location of the device and the depth of the water at that point, and/or an indication of the direction and approximate velocity of the current.

With the aforesaid objects in view, invention resides in its broadest aspect in a water depth indicator comprising means adapted to float on the surface of the water, means associated with the aforesaid means operable to given visible signals, and means for effecting operation of said last named means so that the interval between the visible signals is indicative of the depth of water at that point. As illustrated herein, the device may be adapted to be projected from a ship or dropped from an aircraft onto the surface of the water and to float thereon, and a plurality of pyrotechnic bodies are mounted thereon together with means which is adapted to sound the depth of the water when the device comes to rest and to effect ignition of the pyrotechnics at an interval which is indicative of the depth of the water. The pyrotechnic may be in the nature of flares which may be attached to the device, or projected into the air from the device, and should be of sufficient brilliance to permit observation at the required serviceable distance. The specific means for actuating the flares, as shown herein, comprises a weight releasably associated with the device, which when released, will travel from a position near the surface of the water to the bottom. The rate of sinking of the aforesaid weight is known and the flares are caused visibly to indicate the interval of time between the release of the weight and the time it strikes the bottom. More specifically, the weight is releasably attached by latches to a body adapted to float on the surface of the water, the latches being adapted to release the weight at the end of a predetermined time. As illustrated, this is accomplished by a fuze arranged to be ignited by impact of the device with the water, and at the end of the aforesaid predetermined time, to effect release of the latches, thereby to release the weight, and simultaneously to cause one of the flares to be projected from the device into the air. A line is attached to the weight and is unwound from a drum mounted in the device by its descent into the water. When the weight strikes the bottom, the cessation of movement of the line results in the actuation of means for setting off another flare so that the instant the weight strikes the bottom is known. There is also mounted on the device a container having a dye therein which is released from the container when the weight strikes the bottom, whereupon it colors the water around the device, and hence, gives a visible indication of the condition of the water at that point, that is, whether it has movement in any particular direction. As illustrated herein, there is included means for locking the line when the weight strikes the bottom, thereby anchoring the device so that the direction and velocity of the current may automatically be determined. It is to be observed, however, that the locking means may be dispensed with when the device is to be employed solely for sounding.

It is a further object of the invention to provide a method to employ the aforesaid depth indicator device for obtaining an indication and/or record of the depth of the water at one or more points in a given area prior to entering that area. Accordingly, in another aspect, invention resides in a method which includes as steps, projecting one or more buoyant sounding devices into the water in an area ahead of a ship or into an area into which a ship will subsequently enter, causing the device to sound the depth of the water at that point and causing the device visibly to indicate the sounded depth. In accordance with this aspect of the invention, there is also included, the steps of timing the interval between the visible signals, thereby to ascertain the depth and/or making a photographic record of the position of each device and the visible signals on a moving film. Hence, there may be provided by simple photographic means a record of a large number of indicators which will at one time indicate not only the water depth reported by each device, but also the exact geographical location of each device by means of the visible signals observed and timed on the film for that point. This is believed to be of marked advantage to reconnaissance planes, for by using this method, a large number of soundings may be taken with a minimum of equipment and a minimum of time spent over enemy held, and therefore, dangerous territory.

The invention will now be described with reference to the accompanying drawings, in which:

Fig. 4 is a longitudinal section through the depth indicator;

Fig. 5 is a side view of the depth indicator;

Fig. 6 is a perspective view of the depth indicator;

Fig. 7 is a detail of a latch for releasing the weight being on the line 7—7 of Fig. 4, but after the weight has been released;

Fig. 8 is a detail of a latch for releasing a firing pin arranged to explode a cartridge adapted to puncture the die container;

Fig. 9 is a detail of the brake for locking the governor shaft from rotation; and Fig. 10 is a view on a larger scale showing the firing mechanism details.

Figure 1:
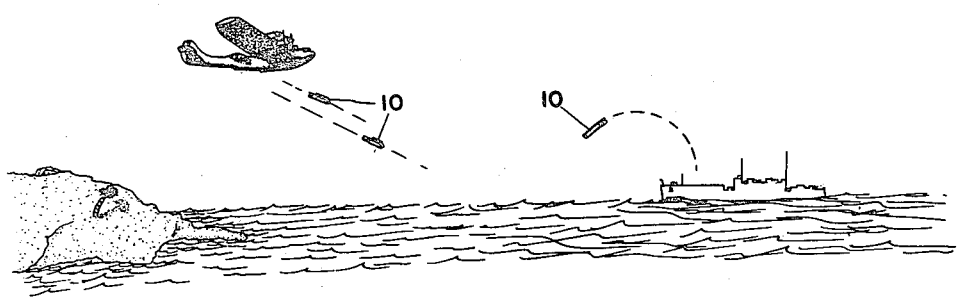
Fig. 1 shows the projection of my novel depth indicating mechanism from planes or ships into the water.
Figure 2:
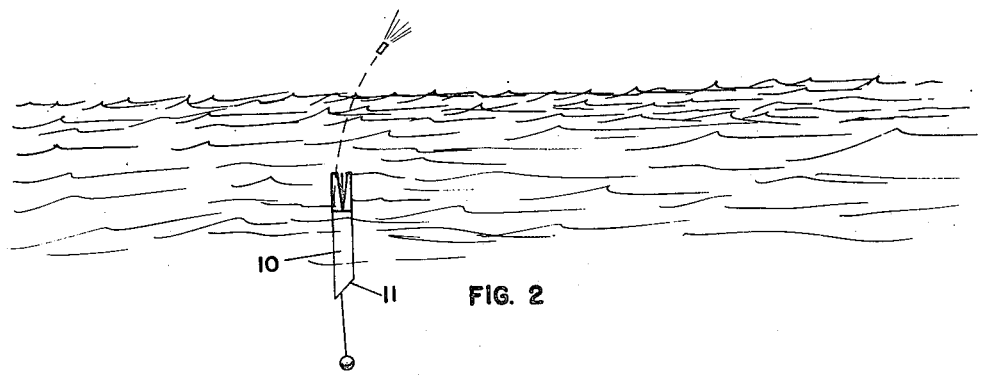
Fig. 2 shows my depth indicator floating on the surface of the water after it has reached equilibrium and at the instant the weight is released and the first flare is projected into the air.

There are many instances where it is desirable to find the depth of water in an area ahead of a ship before it reaches that area, or in some area into which for some reason or other, it would be undesirable to send a ship. The depth indicator of the present invention is particularly designed to meet such a situation and comprises a projectile shaped member 10, Fig. 1, adapted to be dropped from a plane or projected from a suitable device on a ship to the area, the depth of which is to be determined, and when it becomes stable, to send up visible flares at an interval which is proportional to the depth of the water. The force with which the depth indicator strikes the surface of the water will cause it to submerge and to retard the depth of its plunge insofar as possible, the leading or nose end 11 of the projectile is sloped so that it will tend to cut sharply to one side as it enters the water. As will appear hereinafter, there is a float chamber in the member 10 which will cause it to rise to the surface. A time fuze, also to be pointed out hereinafter, is provided to initiate the functioning of the device. Preferably, the time fuze is ignited by impact of the device as it lands in the water so that the distance through which it is projected has no effect on its operation. It is to be understood, however, that the time fuze may be ignited by the projection of the device, and in either case, should be designed to permit the device to rise to the surface and become stabilized before it begins to function, as will appear from the description which follows. In order to stabilize the flight of the device as it is propelled through the air or falls from a plane, there is provided at the tail end 15 of the device, a plurality of fins 16. The propulsion of the device may be accomplished in any one of a number of ways. It may be designed to be propelled from a gun or a compressed air tube. A battery of projectors may be provided to project one or more in an arc at the bow of the ship.

Referring to Fig. 4, for the details of the construction, the depth indicator 10 is shown as consisting of a substantially hollow rectangular body 12 consisting of wood, plastic or metal. It is to be observed, however, that the construction of the device may be cylindrical if desired. In the sloping face of the nose there is seated in a recess, a spherical weight 18 which is releasably held therein by a pair of latches 20 adapted to engage a pair of recesses 22 formed in the sphere substantially diametrically opposite to each other. In areas where it is expected that the water will be deep, it is preferable to form the weight of cast iron or lead which will sink rapidly. In shallow areas, however, where rapid sinking of the weight might result in such rapid operation of the signals as to result in confusion, the weight may be formed of aluminum. The latches 20 are pivotally mounted at 24 in slots formed in the nose and are yieldably urged away from each other to release the weight by a spring 26 which is disposed between the rear ends of the latches at the rear side of the pivots 24. The forward ends of the latches are held in engagement with the notches 22 by a cam 28 which is disposed between the rear ends of the latches 20 and holds them apart in opposition to the spring 26. The cam 28 is pivotally mounted in the body at 30 between the latches and is yieldably urged to rotate on said pivot in a direction to cause the latches to be disengaged from the notches 22 by a spring 34 attached to an arm 32 extending rearwardly of the cam. The cam, however, is prevented from such rotation by a latch 38, Fig. 7, which is arranged to engage a notch 36 formed in the end of the arm 32, the latch 38 being fastened to a spring 40, Fig. 7, which is fastened to a transverse wall 42 extending across the body 12. The spring 40 is fastened to the rear side of the wall 42 and when in operative position, the latch extends through an aperture 44 formed in this wall into engagement with the notch 36. The latch is retained in engagement with the notch 36 by a wire 46 which passes across the back of the spring and through an eye 48 formed in a tab 50 fixed to the wall. The wire 46 extends from this point through the conduit 51 rearwardly of the body 10 and is attached to a plunger 52, the latter extending through a bracket 54 fastened to the rear end wall 56 of the body. On the opposite side of the bracket 54, there is mounted on the plunger 52, a spring 58 which is held in compression between the bracket and a collar 60 fixed to the end of the plunger by a wire 64 passed through an opening 62 formed in the plunger 52. The wire 64 forms part of a time fuze 66. The time fuze 66 is of a common variety which may be caused to ignite by impact, set-back or centrifugal force when the depth indicator is dropped from the plane or projected from a gun or compressed air tube and adapted to withdraw the wire 64 from the hole 62, at the end of a predetermined time. If the fuze is of the impact type, the time interval should be such that sufficient time will be given for the depth indicator to submerge after it strikes the surface of the water, rise to the surface and acquire a stable position before it functions. Preferably, an impact fuze is employed because the time of flight need not be taken into consideration. If, however, it is not of the impact type, sufficient time must be given for it to travel from its point of projection to the surface of the water, to submerge and then rise to the surface and acquire a stable condition. As soon as a stable condition is reached and the fuze has burned to the point where it will withdraw the wire 64 from the opening 62, the plunger 52 will be drawn rearwardly by the spring 58 and in so doing, will draw the wire 46 from the eye 48. As a result, the spring 40 is released and will spring upwardly, as shown in Fig. 7, thus retracting the latch 38 from the notch 36. This in turn will allow the spring 34 to turn the cam 28 about its pivot 30 thereby releasing the latches, whereupon the spring 26 will move the latches 28 away from each other about their pivot 24, thereby releasing the weight 18. As soon as the weight 18 is released, it will begin to sink through the water and at this instant, a flare will be ignited. This is accomplished as follows. A cord 68 is attached to the weight 18 and passes through a sleeve 70 set into the wall 42 and is wound on a drum 72, the latter being mounted on a spindle 74 the ends of which are journalled in bearings 76 and 78 set into suitable blocks 80 and 82 fastened to the inside of the body 12. The bearing 76 is open at its outer end so that the spindle 74 passes through it and to the end of this spindle there is fixed a paddle wheel 84, the latter being set into a recess 86 formed in the wall of the body for a purpose which will appear hereinafter. A foraminous panel 87 is set into the aperture 86 to prevent access of debris which might prevent rotation of the paddle wheel 84.

Figure 3:
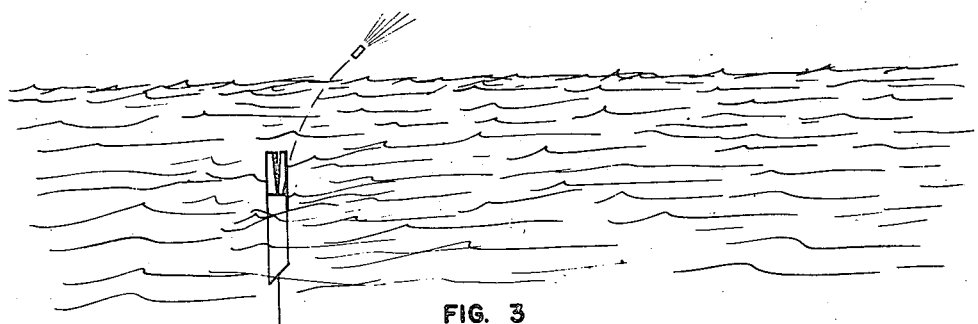
Fig. 3 shows the depth indicator at the instant the weight reaches the bottom and the second flare is projected into the air.

The drum 72 has a flange 88 on one end and a gear 90 on its opposite end between which the cable is retained. Meshing with the gear 90 there is a bevelled gear 92 which is fastened to a shaft 94 passing through a wall 96 formed transversely of the body 12 parallel to the wall 42. The shaft 94 extends toward the rear of the body and is journalled in a second transverse wall 98 spaced from the wall 96 and parallel thereto. The space between the walls 96 and 98 contain mechanism to be described, and in addition constitutes a float chamber for the depth indicator while it is functioning. In order that the depth indicator may be disposed of, that is, so that it will not float around on the surface after it has been used, an aperture 99 is formed in the wall which opens into the float chamber. There is fixed in the aperture 99 a soluble disc 100 such as a salt disc or an Alka Seltzer disc. The soluble disc should keep the depth indicator afloat for a sufficient length of time to perform its function. Mounted on the shaft 94 in the float chamber, there is a governor 102 which is adapted when the shaft is rotated to move a collar 104 rearwardly along the shaft and in so doing to tilt a latch 106 about its pivot point 103. The latch 106 is provided with a hook at one end and a stop at its opposite end. The hook is adapted to engage a pin 108 fastened in one face of a cam 110, the cam being pivotally mounted in the float chamber between the walls 96 and 98 and being urged to rotate in a counter-clockwise direction by a spring 112. Bearing against the surface of the cam 110 is a plunger 116 which extends through the wall 98, the plunger being yieldably held against the surface of the cam by spring 114 surrounding it. The plunger 116 has on that portion of it which extends through the wall 98, a pin 120 which cooperates with a slot 122 formed in one arm of a bell crank lever 123 pivotally mounted on the rear face of the wall 98. The other arm of the lever 123 is adapted to latch over an edge of a collar 128 fixed to a firing pin 130 and to hold the firing pin in a retracted position against a spring 132 surrounding the pin and compressed between the collar and the wall. With the aforesaid construction, it is apparent that when the weight 18 is released and the drum 72 is rotated, the shaft 94 will rotate, causing the governor the move the collar 104 rearwardly, and hence, to turn the latch 106 on its pivot so that the pin 108 is released, thereby allowing the cam 110 to rotate under the influence of the spring 112 until it is stopped by engagement of a pin 135 fixed to the cam with the aforesaid stop. The rotation of the cam brings a notch 115 opposite the plunger 116, whereupon the plunger moves forwardly pivoting the lever 123 and releasing the firing pin 130 so that it strikes the base of a Very pistol cartridge 154, the latter being mounted in the rear wall 56 as indicated. Thus, a visible flare is projected into the air at the moment the weight 18 is released. While the visible signal is described as a Very pistol cartridge, it is possible to use any pyrotechnics, which will give a brilliant signal, and it is within the scope of this invention that such a signal may remain on the device and not be projected into the air. As the weight 18 descends, the cable 68 is unwound from the drum 72, and when it reaches the bottom, as is shown in Fig. 3, a second signal in the nature of a flare is given. The operation of this is as follows. At the moment the weight 18 strikes the bottom, the drum 72 ceases rotation, whereupon the shaft 94 ceases rotation and the governor falls, thereby moving the collar 104 forwardly along the shaft and turning the latch 106 on its pivot so as to cause the stop to disengage the pin 135, whereupon the cam 110 is turned by the spring 112 to bring a second step 138 opposite the plunger 116. When this occurs, the plunger moves forwardly and a finger 140, formed at its rear end, engages one arm of a bell crank lever 144, which is pivoted to the wall 98 and rotates it in a clockwise direction. This lever has formed integral with it, an arm 146 which extends forwardly through the wall 98, as shown in Fig. 9, and has at its terminal end a toothed semi-circular head 147 which is brought into engagement with a toothed member 148 fastened to the shaft 94 by the clockwise rotation of the lever, and hence, locks the shaft 94 against further rotation so that no more cable is paid out from the drum 72. This snubbing of the cable in effect causes the weight 18 to become an anchor which holds the depth indicator at a substantially given position for a sufficient length of time to permit complete functioning. It is to be observed, however, that the locking means is not necessary, especially if the device is to be employed only for depth indications, and when the water is quiet, that is, when there is little current or wind. The rotation of the lever 144 simultaneously releases a collar 152 which is fastened to a firing pin 159, allowing it to move rearwardly under the influence of a spring 156 to impinge upon the base of a Very pistol cartridge 158, the cartridge being mounted in the end wall 56 diametrically opposite the cartridge 154.

With the aforesaid construction, it is apparent that if the rate of sinking of the weight through water is known and this can be determined by experiment and the time that it takes for it to move from the surface of the water to the bottom is observed which may easily be determined by timing the interval between the appearance of the first signal which is set off when the weight is released and the second signal when the weight strikes the bottom the depth at that point may easily be determined by simple calculations. The paddle wheel 84 which was mentioned hereinbefore, is provided to retard the rotation of the drum 72, and this is taken into consideration when the rate of fall of the weight is determined.

It may be desirable not only to know the depth of the water at a given point, but also to know whether there is any current or movement of the water. Provision for this is made by mounting a receptacle 168 in the nose of the body adjacent to the wall 42 and filling it with a dye which will color the water surrounding the device when it is released. While dye is suitable for daylight operations, if night operations are considered, a phosphorescent material may be employed which, when released from the container, will show up in the dark. The dye or phosphorescent material, as the case may be, is released by puncturing the wall of a container 168 and this is provided for by a cartridge 170 which is mounted so that it may be detonated at the moment the weight 18 strikes the bottom. To this end a recess is formed in the member 80, and there is mounted therein cartridge firing mechanism. As illustrated, this mechanism comprises a cylindrical member 172 fixed to the wall 42, threaded at its upper end and adapted to receive a threaded cap 174 which will hold a cartridge 170 in the member 172. The cap has frictionally held therein a firing pin 176 which is adapted to be driven into the rim of the cartridge by a hammer 180, Fig. 8. The hammer 180 has fixed thereto, a collar 182 and between this collar and the rear wall 184 to the recess, there is disposed a spring 186. The hammer is held retracted against the spring by a wire 188 which passes through a hole 190 formed in the hammer. The wire 188 extends rearwardly through the body and is connected at its opposite end to the lever 144 so that simultaneously with the movement of the lever 144 which releases the second flare, the cartridge is fired to perforate the container and release the dye from the container 168 which dye will then pass through the opening left in the wall 11 by the weight 18.

In using the device for determining the depth of water in a given area, the depth of which is unknown, one or more of the depth indicators are projected into the water ahead of the ship, perhaps 1,000 or 2,000 yards and a number of observers having stop watches, record the interval between the first signal and second signals. Knowing the time interval and the rate of sinking of the weight, the depth of the water may immediately be determined so that the course of the ship may be changed if there appears to be a shallow spot or an obstruction ahead. If it is not desirable to send a ship into this area, a plane may be used to drop these devices, and an observer may record the position of the indicator and the interval between flashes of the flares by means of a stop watch.

The foregoing description is concerned with the construction and operation of the depth indicator, however, in another aspect, invention resides in a method of using the indicator for sounding large areas in order to provide data for laying out the contour of the bottom of the ocean or shore at a given point. The method consists in projecting a plurality of these depth indicators into the water in a given area and recording the position of each device and the resultant flares by photographic methods, that is, by taking moving pictures of the devices as they are dropped and send up the flares so that a permanent record may be had for review at a later date giving the exact location of each indicator and the exact interval between flares. The procedure is especially adapted for recording the location and interval between flares when the devices are used in quantity and are dropped from planes.

When the depth indicator is projected from a ship or dropped from a plane, the time fuze 66 will automatically be ignited, as heretofore pointed out, and will burn for a sufficient length of time to permit the indicator to become stable on the surface of the water. As heretofore stated, the depth of the initial plunge will be retarded by the sloping surface 11 which causes the device to broach in its underwater trajectory. As soon as the time fuze has burned to its limit, the wire 64 will be pulled from the plunger 52 and the weight 18 will be released. Simultaneously the drum 72 will be caused to rotate and through mechanism which has been described heretofore, the Very pistol cartridge 154 will be fired so that, for example, a red flare will be seen. The weight 18 sinks through the water, and when it reaches the bottom, the drum 72 will cease to rotate, whereupon through other mechanism previously described, the second Very pistol cartridge 158 will be exploded, sending out, for example, a green flare. The observer will note the period of time between the flares by stop watches and knowing the rate of drop of the weight 18 will be able to calculate the depth of the water. Calculations may be avoided by adjusting the device so that a given time interval will correspond with a given depth. If a plurality of positions are to be recorded at the same time, a motion picture camera is employed for taking pictures of the area, the position of the device and the flares. At the same time that the weight 18 strikes the bottom, the container 168 will be punctured and dye will be released and surround the depth indicator. If the water is still, a circular patch will be evident. If there is a current in one direction or the other, however, this patch will begin to be pear shaped, carrot shaped, and will finally tend to extend or stream out in the direction of the current. Thus an observer from a plane may estimate both direction and velocity of the current. After the depth indicator has performed its function which will occur in a short period, less than a minute, the soluble disc 100 will dissolve in the water and the float chamber will fill up with sea water so that the whole device will sink to the bottom.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. A current direction indicator, comprising means adapted to float on the surface of the water, means adapted to anchor said float means at any given point, means for effecting operation of said anchoring means, means in said float means adapted to indicate the direction of movement of the water, and means rendering said direction indicating means operative by said third named means.

2. A current direction indicator, comprising means adapted to float on the surface of the water, means adapted to anchor said first-named means at any given point, means for effecting operation of said anchoring means, a quantity of dye disposed in said float means, means for effecting release of said dye, said means being operated by the last named means whereupon the dye colors the water surrounding the float means simultaneously with the anchoring thereof.

3. A method for determining the depth of water at a plurality of points in an area, comprising as steps, projecting a plurality of buoyant sounding devices into the water in the area wherein the depth of the water is to be determined, causing each device to sound the depth at the point it occupies, and to give visible signals, the interval between which is proportional to the depth of the water, and making a motion picture record of the positions of said sounding devices and the intervals between said signals.

4. A device for determining the depth of water at any given point, comprising means adapted to be disposed on the surface of the water and to float thereon, a weight adapted releasably to be held by said first named means near the surface of the water, a time fuze adapted to cause said weight to be released at the end of a given time after the device is placed in the water, means controlled by said fuze for indicating the instant said weight is released, and means controlled by said weight for indicating the instant the weight strikes the bottom.

5. A device for determining the depth of water at any given point, comprising means adapted to be disposed on the surface of the water and to float thereon, a weight adapted to be held by said first named means near the surface of the water, a cable attached to said first named means, a drum on said float means on which the cable is wound, said weight when released, being adapted to unwind said cable, and hence to turn the drum, means on said float means for releasably holding the weight near the surface of the water, means on said float means adapted to actuate the releasable means at a predetermined time after the device is placed in the water to release said weight, means actuatable by the initial rotation of the drum to cause visible means to be given indicating a release of the weight, and means operable by the cessation of rotation of the drum to cause visible means to be given indicating the weight has reached the bottom.

6. A water depth indicator comprising a body adapted to float on the surface of the water, a pair of distinguishable signal producing means mounted on said body, a weight, a cable to which said weight is secured, rotatable coil means within said body on which said cable is wound, timer means for simultaneously actuating one of said signal producing means and for rotating said coil means to thereby pay out said cable and weight while simultaneously rotating a governor to cock the other of the signal producing means, said governor triggering said cocked signal producing means when said cable ceases to pay out as said weight reaches the bottom of the water, whereby the interval between said signals is proportional to the water depth at that point.

7. A water depth indicator comprising a body adapted to float on the surface of the water, a pair of distinguishable signal producing means mounted on said body, a weight, means releasably securing said weight to said body, a cable to which said weight is secured, means for simultaneously actuating one of signal producing means and for releasing said securing means to drop said weight to thereby pay out said cable while simultaneously rotating a governor to cock the other of the signal producing means, said governor triggering said cocked signal producing means when said cable ceases to pay out as said weight reaches the bottom of the water, whereby the interval between said signals is proportional to the water depth at that point.

8. A water depth indicator comprising a body adapted to float on the surface of the water, a pair of distinguishable signal producing means mounted on said body, a weight, means releasably securing said weight to said body, a cable to which said weight is secured, fuze means for simultaneously actuating one of said signal producing means and for releasing said weight to thereby pay out said cable while simultaneously rotating a governor to cock the other of the signal producing means, said governor triggering said cocked signal producing means when said cable ceases to pay out as said weight reaches the bottom of the water, whereby the interval between said signals is proportional to the water depth at that point.

9. A water depth indicator comprising a body adapted to float on the surface of the water, a pair of distinguishable signal producing means mounted on said body, a weight, latch means releasably securing said weight to said body, a cable to which said weight is secured, timer means for simultaneously actuating one of said signal producing means and for unlatching said latch means to drop said weight to thereby pay out said cable while simultaneously rotating a governor to cock the other of the signal producing means, said governor triggering said cocked signal producing means when said cable ceases to pay out as said weight reaches the bottom of the water, whereby the interval between said signals is proportional to the water depth at that point.

10. A water depth indicator comprising a body adapted to float on the surface of the water, a pair of distinguishable visible-signal producing means mounted on said body, a weight, latch means releasably securing said weight to said body, a cable to which said weight is secured, rotatable coil means within said body on which said cable is wound, timer means for simultaneously actuating one of said visible-signal producing means and for unlatching said latch means to drop said weight to thereby pay out said cable while simultaneously rotating a governor to cock the other of the visible-signal producing means, said governor triggering said cocked visible-signal producing means when said cable ceases to pay out as said weight reaches the bottom of the water, whereby the interval between said visible-signals is proportional to the water depth at that point.

11. A water depth indicator comprising a body adapted to float on the surface of the water, a pair of distinguishable visible-signal producing means mounted on said body, a weight, latch means releasably securing said weight to said body, a cable to which said weight is secured, rotatable coil means within said body on which said cable is wound, timer means for simultaneously actuating one of said visible-signal producing means and for unlatching said latch means to drop said weight to thereby pay out said cable while simultaneously rotating a governor to cock the other of the visible-signal producing means, said governor triggering said cocked visible-signal producing means when said cable ceases to pay out as said weight reaches the bottom of the water, whereby the interval between said visible-signals is proportional to the water depth at that point, and soluble means in said floating body limiting the flotation period thereof.

12. A water depth indicator comprising a body adapted to float on the surface of the water, a pair of distinguishable signal producing means mounted on said body, a weight, a cable to which said weight is secured, rotatable coil means within said body on which said cable is wound, timer means for simultaneously actuating one of said signal producing means and for initiating the rotation of said coil means to thereby pay out said cable, a governor rotatably connected to said coil means, said governor cocking the other of said signal producing means while it rotates and triggering said other signal producing means to produce such signal when said weight reaches bottom and said governor ceases rotation, whereby the interval between said signals is proportional to the water depth at that point.

13. A water depth indicator comprising a body adapted to float on the surface of the water, a pair of distinguishable signal producing means mounted on said body, a weight, means releasably securing said weight to said body, a cable to which said weight is secured, rotatable coil means within said body on which said cable is wound, timer means for simultaneously actuating one of said signal producing means and for releasing said securing means to drop said weight to thereby pay out said cable, said paying out cable rotating said coil means on which it is wound, a governor rotatably connected to said coil means, said governor cocking the other of said signal producing means while it rotates and triggering said other signal producing means to produce such signal when said weight reaches bottom and said governor ceases rotation, whereby the interval between said signals is proportional to the water depth at that point.

14. A water depth indicator comprising a body adapted to float on the surface of the water, a pair of distinguishable signal producing means mounted on said body, a weight releasably secured to said body, a cable to which said weight is secured, rotatable coil means within said body on which said cable is wound, timer means for simultaneously actuating one of said signal producing means and for releasing said weight to thereby pay out said cable, said paying out cable rotating said coil means on which it is wound, a governor rotatably connected to said coil means, said governor cocking the other of said signal producing means while it rotates and triggering said other signal producing means to produce such signal when said weight reaches bottom and said governor ceases rotation, whereby the interval between said signals is proportional to the water depth at that point.

15. A water depth indicator comprising a body adapted to float on the surface of the water, a pair of distinguishable signal producing means mounted on said body, a weight, latch means releasably securing said weight to said body, a cable to which said weight is secured, rotatable coil means within said body on which said cable is wound, fuze actuated means for simultaneously actuating one of said signal producing means and for unlatching said latch means to drop said weight to thereby pay out said cable, said paying out cable rotating said coil means on which it is wound, a governor rotatably connected to said coil means, said governor cocking the other of said signal producing means while it rotates and triggering said other signal producing means to produce such signal when said weight reaches bottom and said governor ceases rotation, whereby the interval between said signals is proportional to the water depth at that point.

16. A water depth indicator comprising a body adapted to float on the surface of the water, a pair of distinguishable signal producing means mounted on said body, a weight, latch means releasably securing said weight to said body, a cable to which said weight is secured, rotatable coil means within said body on which said cable is wound, timer means for simultaneously actuating one of said signal producing means and for unlatching said latch means to drop said weight to thereby pay out said cable, said paying out cable rotating said coil means on which it is wound, a governor rotatably connected to said coil means, said governor cocking the other of said signal producing means while it rotates and triggering said other signal producing means to produce such signal when said weight reaches bottom and said governor ceases rotation, whereby the interval between said signals is proportional to the water depth at that point.

LAWRENCE H. TAYLOR.

REFERENCES CITED

The following references are of record in the file of this patent:

UNITED STATES PATENTS

| Number | Name | Date |
|---|---|---|
| 11,001 | Brown | June 6, 1854 |
| 13,519 | Boyd | Sept. 4, 1885 |
| 409,780 | Flad | Aug. 27, 1889 |
| 608,741 | Wood | Aug. 9, 1898 |
| 756,887 | Philip | Apr. 12, 1904 |
| 1,667,540 | Dorsey | Apr. 24, 1928 |
| 1,698,857 | Schmidt et al. | Jan. 15, 1929 |
| 1,695,701 | Steiner et al. | Dec. 18, 1928 |
| 1,763,377 | Sperry | June 10, 1930 |
| 2,154,376 | Cline | Apr. 11, 1939 |
| 2,252,572 | Lang | Aug. 12, 1941 |

FOREIGN PATENTS

| Number | Country | Date |
|---|---|---|
| 258,084 | Germany | Mar. 29, 1913 |
| 291,444 | Great Britain | Dec. 13, 1928 |
| 641,132 | France | Apr. 10, 1928 |